April 21, 1970   E. J. DEVEAU ETAL   3,508,275
DOPPLER ARRAY WITH INTERLEAVED TRANSMITTING
AND RECEIVING SLOTTED WAVEGUIDES
Filed March 12, 1968                                2 Sheets-Sheet 2

United States Patent Office 3,508,275
Patented Apr. 21, 1970

3,508,275
DOPPLER ARRAY WITH INTERLEAVED
TRANSMITTING AND RECEIVING
SLOTTED WAVEGUIDES
Emile J. Deveau and John C. Rolfs, Pleasantville, N.Y.,
assignors to Singer-General Precision, Inc., a corporation of Delaware
Filed Mar. 12, 1968, Ser. No. 712,496
Int. Cl. H01q 13/10
U.S. Cl. 343—768    6 Claims

ABSTRACT OF THE DISCLOSURE

Slotted waveguide sections are used for transmitting and receiving microwave frequency modulated continuous wave signals. The transmitting and receiving arrays are arranged in planar configuration. In order to obtain maximum isolation between transmitted and received signals and at the same time provide a compact structure the transmitting and receiving waveguide sections are interleaved so that a planar structure having alternate transmitting and receiving slotted waveguide sections is formed. Separate transverse feed waveguide sections at each end of the antenna are provided for coupling the transmitted and received signals to the respective slotted array. The feed waveguide sections are provided with coupling ports at both ends so that four pairs of input and output ports are provided. Suitable switching circuits are provided to switch the signals to the various ports so that four pairs of signal beams are transmitted and received.

DESCRIPTION OF THE INVENTION

In Doppler navigation systems which measure the speed and drift of an aircraft it is desirable to transmit and receive at least three, if not four, narrow beams of microwave radiation. At the same time in FM CW systems of this nature it is desirable to prevent leakage of the transmitted signal into the receiving circuits, hence there must be as much isolation between the receiving and transmitting circuits as is possible to obtain. In the past this has been accomplished by using separate receiving and transmitting antennas physically separated from each other. This is sometimes called space duplexing. Such an arrangement while giving proper isolation has the disadvantage of providing a relatively large sized installation. The present invention overcomes this problem by providing a single compact structure by interleaving the transmitting and receiving arrays and at the same time so positioning the radiating slots and the arrays that high isolation between the receiving and transmitting sections are obtained.

An object of the invention, therefore, is to provide a compact antenna structure for transmitting microwave signals for illuminating the earth's surface in spaced restricted areas and for receiving the reflected Doppler shifted echo signals from those areas.

A further object is to provide, in a single planar array structure, a high degree of isolation between the transmitting and receiving arrays.

The invention will be more fully understood from the following description taken with the drawings in which.

Figure 1:
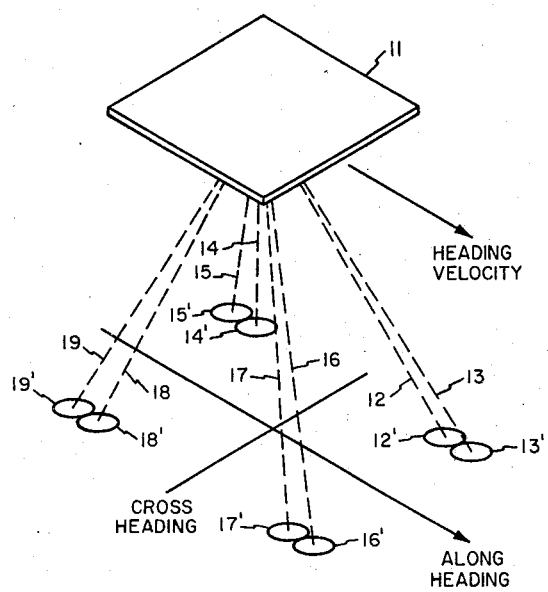
FIGURE 1 is an isometric view of the array of the invention and the beams radiated therefrom and received thereby.

Referring now to FIGURE 1 a planar array 11, in a timing sequence later to be described, transmits and receives four pairs of microwave beams 12–13, 14–15, 16–17 and 18–19 directed to and reflected from illuminated areas 12'–19'. As used herein, the term "illuminated areas" designates those areas of the surface on which microwave energy impinges as well as those areas from which the Doppler echo signals are reflected. By providing illuminated areas in pairs of slightly displaced areas as shown, a beam lobing technique is utilized to provide suitable overwater corrections as more fully disclosed in Patent No. 3,113,308.

Figure 2:
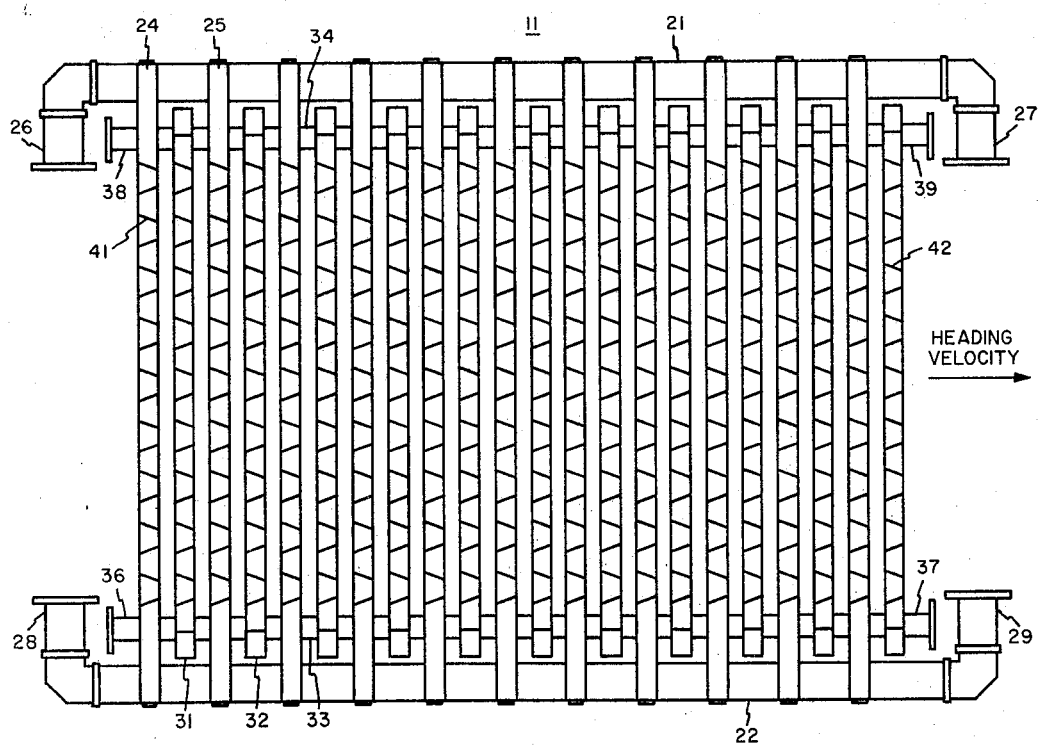
FIGURE 2 is a plan view of the antenna array viewed from the radiating surface thereof.

Turning now to FIG. 2, the planar array of the invention is illustrated in a plan view looking toward the radiating surface thereof. Feed waveguides 21 and 22 are coupled to the transmitting arrays such as 24, 25 in a manner later to be described. Feed waveguide 21 is provided at each end with input ports 26 and 27 and similarly feed waveguide 22 is provided with input ports 28 and 29 also located at either end.

Similarly receiving arrays such as 31, 32 are coupled at either end to receiving feed waveguides 33, 34. The receiving waveguides 33 and 34 are also provided with exit ports located at each end, guide 33 having ports 36 and 37 and guide 34 being provided with ports 38 and 39.

The receiving arrays 31, 33 are interleaved with the transmitting arrays 24, 25 and all are provided with edge cut radiating slots such as 41, 42. These radiating slots are alternately inclined transversely of the narrow face of the radiating waveguides to provide antiphase coupling as is well known in the art. It is also to be noted that corresponding adjacent slots in the transmitting and receiving array are similarly inclined. Tests indicate that this arrangement gives a somewhat higher isolation between the transmitted and received signals than is present in a case where the adjacent slots of the transmitting and receiving arrays are inclined oppositely; 45–70 db in the former case as compared to 44–58 db in the latter.

Figures 3, 4:
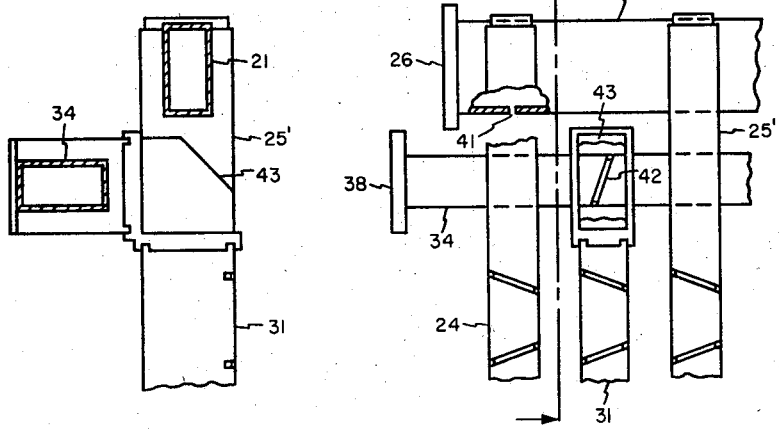
FIGURE 3 is an enlarged view of a portion of the antenna array with parts broken away to illustrate the coupling slots.
FIGURE 4 is a sectional view taken on the line 4—4 of FIGURE 3.

FIGURE 3 illustrates the manner in which the feed waveguides are coupled to the respective transmitting and receiving arrays. Transmitting feed waveguide 21 has a slot 41 cut in its narrow face, coupling the energy from the feed waveguide into the radiating waveguide 24 at the end thereof. Similar couplings are provided for all other radiating transmitting waveguide structures. The receiving feed waveguide similarly has a slot 42 cut in its narrow face and the energy is coupled from the receiving array 31 through a 90° bend 43 to the feed waveguide 34.

As shown in FIGURE 4 the transmitting feed waveguides such as 21 lie in the same plane as the radiating waveguide structure while the receiving feed waveguides such as 34 lie above the face of the radiating structure and are connected to the receiving elements of the structure by bends such as 43.

As heretofore stated, it is desired to switch the transmitting and receiving beams so as to provide pairs of illuminated areas which both receive the impinging microwave energy and reflects it as Doppler shifted echo signals. To this end the area pair 12' and 14' are illuminated alternately with the area pair 13' and 15'. The area pairs 16', 17', 18' and 19' are unilluminated at this time. This alternating illumination of the area pairs 12', 14' and 13', 15' takes place for a selected number of cycles and then the switching action is shifted to the illuminated area pairs 16', 18' and 17', 19' which are also alternately illuminated in pairs for the same number of cycles while areas 12', 13', 14' and 15' remain unilluminated. In this way beam lobed janus pairs of signals are transmitted and received which may provide the appropriate Doppler signals to obtain ground track velocity and drift by serving the antenna array as fully described in Patent No. 3,113,308 referred to above.

Figure 5:
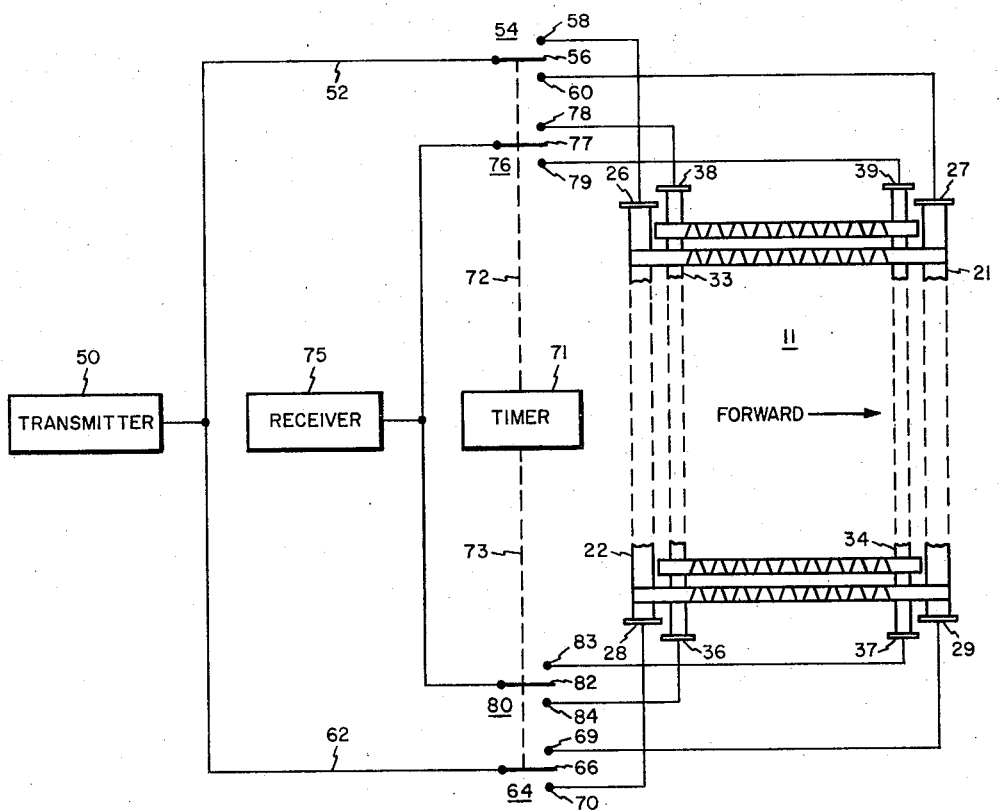
FIGURE 5 is a schematic diagram illustrating the switching circuit.

FIGURE 5 illustrates in schematic and block form a circuit which may be utilized to provide the proper beam lobed switching. In FIGURE 5 mechanical switches are disclosed for the sake of simplicity of illustration but it will be understood by those skilled in the art that crystal diode switches properly energized and inserted in waveguide structures may be used or in the alternative ferrite circulators properly connected may be substituted so that purely electronic switching is attained.

The transmitter 50 is connected by conductor 52 to the movable contact 56 of the switch 54. This switch or its electronic substitute has three positions; open as shown, engagement with contact 58 or engagement with contact 60. When in the open position as shown, no signal is applied to either transmitting feed waveguide port 26 or 27. When in engagement with fixed contact 58, signal is applied to port 26 at the left hand rear of the antenna looking in the forward direction of travel. Conversely when the movable contact 56 engages cotnact 60, signal is applied to the forward left hand port 27.

Transmitter 50 is also connected through conductor 62 to the movable contact 66 of switch 64 which operates in a manner similar to switch 54 so that when open neither port 28 nor 29 is coupled to the transmitter while when on contact 70 the right rear port 28 receives signal and when on contact 68 the right forward port 29 receives a signal.

By suitable design the slots in the radiating waveguides and the feed guides are so adjusted, the looking angles are slightly different when signal energy is applied to a forward port than it is when applied to a rear port. Thus the beam lobed pairs of illuminated areas 12', 13', 14', 15'; 16', 17' and 18', 19' of FIGURE 1 are formed. For example, imposition of signal energy on port 28 illuminates both areas 12' and 14; (see FIGURE 1) imposition of signal energy on port 27 illuminates both areas 13' and 15'. Similarly when operation is taken over by switch 64 and signal energy is applied to port 28, both areas 16' and 18' are illuminated whereas when signal energy is applied to port 29 both areas 17' and 19' are illuminated. As heretofore stated, it is desired to illuminate areas 12', 14' alternately with areas 13', 15' for several cycles before bea mlobing areas 16', 17', 18' and 19'. Accordingly, movable contact 56 is operated for about five cycles at 20 cycles per second before the same action takes place through switch 64 so that switches 54 and 64 alternate in operation at a rate of four cycles per second. This action may be accomplished in known manner by the timer 71 shown mechanically coupled to switches 54 and 64 by the dotted lines 72 and 73.

The same action takes place with respect to the receiver 75 through the medium of switches 76 and 77 and ports 36, 37, 38 and 39 of the receiving array. When contact 77 engages contact 78 signal energy is received via port 38 and therefore from areas 12', 14' (FIGURE 1). Engagement of contact 79 connects port 39 to the receiver circuit and signal energy is received from areas 13', 15'. Similarly switch 80 acts to alternately couple ports 36 and 37 to the receiver 75 through fixed contacts 83 and 84 and movable contact 82. When port 36 is coupled to the receiver, signals are received from areas 16', 18' and when it is coupled to port 37 signals are received from areas 17', 19'.

Since the areas on which the signal impinges at any instant of time must be the same from which echo signal is received, switches 54 and 76 are ganged together and operated in unison by the timer 71. Likewise switches 64 and 80 are ganged together and also operated in unison by the timer 71 during the interval when switches 54 and 76 are not operated and thus in open condition.

It is to be understood that the compact interleaved transmitting and receiving antenna as herein described may find equal application in systems wherein the antenna is constantly servoed so as to always be directed along ground track regardless of the heading direction of the aircraft on which it is mounted and in so-called fixed antenna systems wherein the antenna is fixed relative aircraft forward and aft direction so that velocity along ground track and drift are computed from aircraft heading and cross-heading components. An example of the latter type of system may be found in Patent No. 2,981,944.

What is claimed is:

1. A planar microwave antenna array for directing a plurality of microwave beams toward a restricted area of illumination on the earth's surface and for receiving echo signals therefrom comprising:
   a plurality of transmitting radiating waveguide sections positioned parallel to each other in a single plane,
   a first feed waveguide section coupled to one end of each of said transmitting waveguide sections,
   a second feed waveguide section coupled to the other end of each of said transmitting waveguide sections,
   a plurality of receiving waveguide sections positioned parallel to each other in the same plane as said transmitting waveguide sections, said receiving waveguide section being interleaved with said transmitting waveguide sections so that transmitting and receiving waveguide sections alternate along the length of said array,
   a third feed waveguide section coupled to one end of each of said receiving waveguide sections,
   a fourth feed waveguide section coupled to the other end of each of said receiving waveguide sections, and
   coupling portions located at each end of each of said feed waveguide sections to provide coupling ports for both transmitting and receiving feed waveguide sections at the forward left, rear left, forward right and rear right of the antenna array.

2. A planar microwave antenna array as set forth in claim 1 in which:
   said transmitting and receiving arrays are slotted antiphase arrays having adjacent slots in each array inclined oppositely to each other.

3. A planar microwave antenna as set forth in claim 2 which the slots are edge cut slots so dimensioned that the areas of illumination on the earth's surface occurs in contiguous pairs of areas, a first pair forward to the left, a second pair to the left rear, a third pair forward to the right and a fourth pair to the right rear depending on which of the feed waveguide ports are coupled to microwave energy.

4. A planar microwave antenna array as set forth in claim 3 including switching means for alternately coupling said forward left and rear left coupling ports at a selected rate for a first interval of time and for coupling said forward right and rear right coupling ports at the same selected rate during a second interval of time equal to said first interval of time, said first and second intervals of time alternating at a rate less than said selected rate.

5. A planar microwave antenna array as set forth in claim 3 in which the adjacent slots in adjacent transmitting and receiving arrays are inclined in the same direction with respect to each other.

6. A planar microwave antenna array as set forth in claim 5 including switching means for alternately coupling said forward left and rear left coupling ports at a selected rate for a first interval of time and for coupling said forward right and rear right coupling ports at the same selected rate during a second interval of time equal to said first interval of time, said first and second intervals of time occurring in alternation at a rate less than said selected rate.

References Cited

UNITED STATES PATENTS 3,135,959   6/1964   Moran _____ 343—768

ELI LIBERMAN, Primary Examiner

U.S. Cl. X.R.

343—771